United States Patent
Mawby et al.

(10) Patent No.: US 9,823,153 B2
(45) Date of Patent: Nov. 21, 2017

(54) TIRE UNIFORMITY IMPROVEMENT THROUGH IDENTIFICATION OF PROCESS HARMONICS FROM STATIC BALANCE MEASUREMENTS

(71) Applicants: William David Mawby, Greenville, SC (US); Steve Simons, Greenville, SC (US); James Michael Traylor, Greer, SC (US); Anton Felipe Thomas, Greer, SC (US); Jonathan Sauls, Simpsonville, SC (US)

(72) Inventors: William David Mawby, Greenville, SC (US); Steve Simons, Greenville, SC (US); James Michael Traylor, Greer, SC (US); Anton Felipe Thomas, Greer, SC (US); Jonathan Sauls, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 14/893,166

(22) PCT Filed: Jun. 18, 2013

(86) PCT No.: PCT/US2013/046297
§ 371 (c)(1),
(2) Date: Nov. 23, 2015

(87) PCT Pub. No.: WO2014/204443
PCT Pub. Date: Dec. 24, 2014

(65) Prior Publication Data
US 2016/0116363 A1      Apr. 28, 2016

(51) Int. Cl.
G01M 17/02 (2006.01)
G01M 1/12 (2006.01)

(52) U.S. Cl.
CPC .............. *G01M 1/12* (2013.01); *G01M 17/02* (2013.01); *G01M 17/024* (2013.01)

(58) Field of Classification Search
None
See application file for complete search history.

(56) References Cited

U.S. PATENT DOCUMENTS

| 5,237,505 A | 8/1993 | Beebe |
| 5,917,726 A | 6/1999 | Pryor |

(Continued)

FOREIGN PATENT DOCUMENTS

| EP | 1 247 639 | 10/2002 |
| JP | 2005121555 | 5/2005 |
| JP | 2006308320 | 11/2006 |

OTHER PUBLICATIONS

PCT International Search Report for PCT/US2013/046297, dated Dec. 31, 2013—11 pages.

*Primary Examiner* — Andrew Allen
(74) *Attorney, Agent, or Firm* — Dority & Manning, P.A.

(57) ABSTRACT

Systems and methods for improving tire uniformity using estimates of process harmonic magnitude(s) from static balance measurements for a set of tires are provided. In particular, a sequence of observed magnitudes of static balance can be obtained for a set of tires. The sequence of observed magnitudes can be analyzed in conjunction with a baseline magnitude pattern associated with the process harmonic to derive a magnitude of the process harmonic. The magnitude of the process harmonic can be used to improve the uniformity of tires.

15 Claims, 7 Drawing Sheets

(56) References Cited

U.S. PATENT DOCUMENTS

| | | | |
|---|---|---|---|
| 6,609,074 B2 | 8/2003 | Shteinhauz | |
| 6,615,144 B2 | 9/2003 | Williams et al. | |
| 7,082,816 B2 | 8/2006 | Zhu | |
| 2006/0137802 A1 | 6/2006 | Flament et al. | |
| 2007/0023122 A1* | 2/2007 | Moriguchi | G01M 17/02 156/64 |
| 2007/0137763 A1 | 6/2007 | Burg et al. | |
| 2007/0144657 A1 | 6/2007 | Flament et al. | |
| 2011/0221086 A1* | 9/2011 | Hair | G01M 17/024 264/40.1 |
| 2011/0246128 A1 | 10/2011 | Nicholson et al. | |
| 2012/0031179 A1 | 2/2012 | Mawby | |
| 2012/0035757 A1* | 2/2012 | Mawby | B29D 30/0633 700/104 |
| 2012/0095587 A1 | 4/2012 | Hair, Jr. et al. | |
| 2013/0090879 A1* | 4/2013 | Estor | G06F 17/40 702/97 |
| 2013/0098148 A1* | 4/2013 | Mawby | G01M 17/02 73/146 |
| 2013/0253686 A1 | 9/2013 | Flament et al. | |
| 2015/0165705 A1* | 6/2015 | Mawby | B29D 30/0061 702/84 |
| 2015/0246588 A1* | 9/2015 | Mawby | B60C 99/006 700/105 |
| 2015/0306707 A1* | 10/2015 | Nicholson | B29D 30/0061 700/110 |
| 2016/0236431 A1* | 8/2016 | Mawby | B29D 30/0633 |

\* cited by examiner

TIRE UNIFORMITY IMPROVEMENT THROUGH IDENTIFICATION OF PROCESS HARMONICS FROM STATIC BALANCE MEASUREMENTS

FIELD OF THE INVENTION

The present disclosure relates generally to systems and methods for improving tire uniformity, and more particularly to analyzing and improving the uniformity of tires by deriving process harmonics from static balance measurements.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance (e.g. mass imbalance), and rolling force variations (radial force variation, lateral force variation and tangential force variation, sometimes also called longitudinal or fore and aft force variation). Tire uniformity measurements, such as static balance measurements, can result from manufacturing effects that have both tire effects and process effects. Examples of tire effects include effects due to tire material components (e.g., the product start point or joint overlap location of one or more of casing textile plies, belt plies, bead rings, inner liner, tread and other rubber layers of the tires), manufacturing techniques (e.g., the relative location in which a green tire is introduced on a building drum, placed into a mold or curing press, and the like), and/or controllable conditions used in the tire construction process (e.g., the temperature and pressure at which green tires are subjected during the curing process or other manufacturing steps.) Examples of process effects may arise from such manufacturing conditions as a roller influence, extruder surge, fluctuation in a process condition (e.g., temperature, pressure, speed, etc.) and others.

The impact of tire effects and process effects within tire uniformity measurements are respectively represented by "tire harmonic" or "process harmonic" components of the composite uniformity measurement. A tire harmonic component has a period that fits an integer number of times within the tire circumference. A process harmonic component has a period that does not fit an integer number of times within the tire circumference.

One uniformity parameter directed to mass variance is static balance. A static balance measurement can provide a measure of mass imbalance of a tire. In particular, the static balance measurement can represent the first harmonic of the mass imbalance about the tire. Static balance measurements can be acquired by a static balance machine where a tire can be placed on its vertical axis. Gravity causes the portion of the tire with the greatest mass to deflect downward. The magnitude and azimuthal location of the deflection can provide a measurement of the static balance of the tire. The static balance can be represented as a vector with the magnitude determined based at least in part on the amount of deflection and the phase angle determined from the azimuthal location of the deflection.

In many practical cases, only the magnitude of the static balance measurement is acquired and/or stored in a memory for future analysis. For instance, determination of the azimuthal location may require that a barcode or other indicator is attached to the tire during its manufacture to act as a reference point for measurement of the uniformity parameter. If this capability is absent, then the azimuthal location of the deflection can be difficult to determine.

Process harmonics can cause static balance measurements to vary from tire to tire depending on the particular pattern and rate of introduction of the process harmonic. For instance, a static balance measurement for a first tire can have a different magnitude and azimuthal location than a static balance measurement in a second tire manufactured according to the same manufacturing process. It can be desirable to derive process harmonic information from a sequence of static balance measurements for a set of tires to drive process improvement and correction efforts.

Thus, a need exists for a system and method for estimating magnitudes of process harmonics from a sequence of the static balance measurements for a set of tires. A system and method that can estimate magnitudes of process harmonics without requiring azimuthal or phase angle information for the static balance measurements would be particularly useful.

SUMMARY OF THE INVENTION

Aspects and advantages of the invention will be set forth in part in the following description, or may be apparent from the description, or may be learned through practice of the invention.

One exemplary aspect of the present disclosure is directed to a method for improving the uniformity of a tire using static balance measurements for a set of a plurality of tires. The method includes identifying at least one candidate process effect and obtaining a sequence of observed magnitudes for the set of tires. The sequence of observed magnitudes includes a magnitude of static balance for each tire in the set of tires. The method further includes obtaining a baseline magnitude pattern associated with the candidate process effect. The baseline magnitude pattern includes a baseline magnitude of static balance for each tire in the set of tires. The method further includes determining, with a computing device, a magnitude of a process harmonic associated with the candidate process effect based at least in part on the sequence of observed magnitudes and the baseline magnitude pattern. The method can further include modifying tire manufacture based at least in part on the magnitude of the process harmonic.

Another exemplary aspect of the present disclosure is directed to a system for improving the uniformity of tires. The system includes a measurement machine configured to obtain static balance measurements for each tire in a set of tires. The system further includes a computing device coupled to the measurement machine. The computing device includes one or more processors and at least one non-transitory computer-readable memory. The at least one non-transitory computer-readable memory stores computer readable instructions that when executed by the one or more processors causes the one or more processors to implement any of the methods for obtaining a magnitude of a process harmonic using a sequence of static balance measurements disclosed herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 plots the index of the data along the abscissa and magnitude of static balance along the ordinate.

FIG. 5 plots the index of data along the abscissa and magnitude of static balance along the ordinate.

FIG. 8 plots an index of tire points across the twenty tires along the abscissa and magnitude of the static balance waveform along the ordinate.

FIG. 9 plots the index of the sequence of observed magnitudes along the abscissa and observed magnitude along the ordinate.

FIG. 10 plots the index of the residuals by tire along the abscissa and magnitude of the residual along the ordinate.

DETAILED DESCRIPTION

Figure 1:
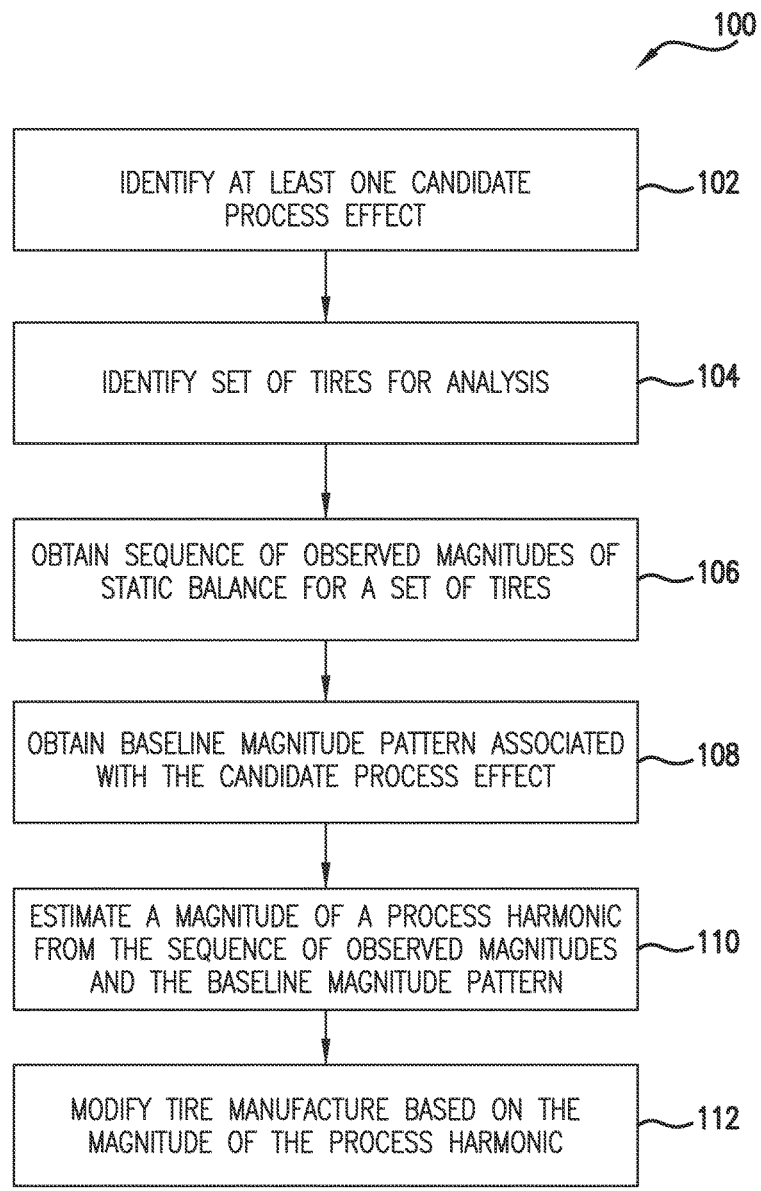
FIG. 1 depicts a flow diagram of an exemplary method for improving the uniformity of a tire according to an exemplary embodiment of the present disclosure.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to improving tire uniformity using estimates of process harmonic magnitude(s). In particular, a sequence of observed magnitudes of static balance can be obtained for a set of tires. The sequence of observed magnitudes can be analyzed to derive a magnitude of a process harmonic associated with a candidate process effect. The knowledge of the magnitude of the process harmonic can be used to improve the uniformity of tires.

Tires, even when manufactured under like conditions, can be subject to dynamic manufacturing effects in two primary ways. In a first case, the periods of the manufacturing effects coincide with the tire circumference. These effects are referred to as tire effects because they are associated with the tire circumference. Tire effects can generally be composed of various tire harmonics that have a period that fits an integer number of times within the circumference of the tire. Typical tire effects can be attributable to tread joint width, out-of-roundness of the building drums, press effects, and other effects.

In a second case, the periods of the manufacturing effects do not coincide with the tire circumference. These effects are referred to as process effects because they are related to process elements rather than tire circumference. Process effects can generally be composed of various process harmonics that have a period that does not fit an integer number of times within the circumference of the tire. Typical process effects can be caused, for instance, in the preparation of a semi-finished product (e.g. a tread band), by thickness variations due to the extruder control system or by rollers that can deform the shape of softer products.

According to aspects of the present disclosure, a magnitude of a process harmonic associated with at least one candidate process effect can be determined from a sequence of observed magnitudes of static balance for a set of tires. A static balance measurement can provide a measure of mass imbalance of a tire. In particular, the static balance measurement can represent the first harmonic of the mass imbalance about the tire. Static balance measurements can be acquired by a static balance machine where a tire can be placed on its vertical axis. Gravity causes the portion of the tire with the greatest mass to deflect downward. The magnitude and azimuthal location of the deflection can provide a measurement of the static balance of the tire.

The magnitude of the process harmonic can be estimated without requiring phase angle or azimuth information associated with the observed magnitudes of static balance. More particularly, the magnitude of the process harmonic can be estimated by obtaining a sequence of observed magnitudes of static balance in addition to a baseline magnitude pattern for the set of tires. The baseline magnitude pattern for the set of tires can specify a baseline magnitude for each tire in the set of tires. A model can be constructed correlating the sequence of observed magnitudes with the baseline magnitude pattern. Regression or programming techniques can be used to estimate a coefficient associated with baseline magnitude pattern in the model. The magnitude of the process harmonic can then be determined from the estimated coefficient.

In a particular implementation, the baseline magnitude pattern for the set of tires can be synchronized with the sequence of observed magnitudes such that an index associated with the baseline magnitude pattern and an index associated with the sequence of observed magnitudes start at or about at the same point on the same tire. The baseline magnitude pattern and the sequence of observed magnitudes can be either physically guaranteed to be synchronous or the data can be processed to identify a baseline magnitude pattern synchronous with the sequence of observed magnitudes.

In another particular implementation, residuals determined as a result of the regression or programming analysis can be further analyzed to identify the magnitude of additional process harmonics associated with different candidate process effects. In particular, the residuals can be used to specify a new sequence of observed magnitudes. The new sequence of observed magnitudes can be analyzed in conjunction with a baseline magnitude pattern to identify the magnitude of a process harmonic associated with a different process effect. This process can be repeated iteratively until the residuals no longer exhibit a pattern or until the standard deviation of the residuals is on the same order as that of the measurement error.

The estimated magnitude of the process harmonic can be used to lead to improvements in the tire manufacturing processes. For instance, the estimated magnitude of the process harmonic can be compared to thresholds to determine if corrective action needs to be taken. The thresholds can be chosen to optimize the uniformity yield and the cost of corrective action. A catalogue of such process harmonics can then be maintained and can be used to swiftly address any future process deterioration. The rate of introduction of the particular candidate process effect can be used to determine the offending part of the tire manufacturing process that needs to be corrected or adjusted.

As another example, the estimated process harmonic magnitude can be determined across different time intervals. The estimated process harmonic magnitude can be compared across the time intervals to determine the stability of the process effects and to determine if any new upsets or anomalies in the manufacturing process have occurred. For instance, if an estimated magnitude changes across different time intervals, this can provide an indication of the need for a maintenance event to address the particular process harmonic. The estimation of specific process harmonics effects can be used to achieve more process stability in the static balance parameter than can usually be achieved when only tire harmonics are available. The reduced tire to tire variability than can accrue from this added stability can lead to increased uniformity yields.

Exemplary Method for Improving Tire Uniformity

FIG. 1 depicts a flow diagram of an exemplary method (100) for improving the uniformity of a tire according to an exemplary embodiment of the present disclosure. The method (100) can be implemented by any suitable system, such as the system depicted in FIG. 7. In addition, FIG. 1 depicts steps performed in a particular order for purposes of illustration and discussion. One of ordinary skill in the art, using the disclosures provided herein, will understand that the steps of any of the methods disclosed herein can be adapted, omitted, rearranged, combined, and/or expanded in various ways without deviating from the scope of the present disclosure.

At (102), the method includes identifying at least one candidate process effect. A single process effect can be targeted as a candidate process effect for analysis or multiple process effects can be targeted as candidate process effects for analysis. The at least one candidate process effect can be expressed or identified in terms of various parameters, including but not limited to the rate (e.g. frequency or period) of introduction relative to the dimensions of the tire (e.g., tire circumference, radius, diameter, discrete number of data points around the tire or the like).

The process harmonic can also be expressed as a harmonic number (e.g. 1.25, 0.8, etc.) The harmonic number can be related to the frequency ($\omega$) of the candidate process effect by the following formula: $2\pi h/N$, where h is the harmonic number and N is the number of data points measured around the periphery of a tire when obtaining a uniformity measurement. Frequency ($\omega$) can be quantified as Radians per data point measured around the tire. When considering a total number of p candidate process effects, the rate of introduction of each process effect can be defined in terms of its respective harmonic number $h_p$ and/or frequency of introduction $\omega_p$.

The candidate process effects can be known process effects identified based on certain known features of the manufacturing process, or the candidate process effects can be unknown. For instance, if the physical process effect sources are known, it can be possible to identify the candidate process effects from certain aspects and/or conditions of the manufacturing process such as machine element diameters or extrusion control characteristics.

If the candidate process effects are unknown, the candidate process effects can be identified using a variety of search techniques. One exemplary search technique can include specifying a series of candidate process effects in stepped increments over a range of candidate process effects (e.g. 0.2, 0.3, 0.4 . . . 1.5, etc.). As will be discussed in more detail below, a regression analysis or a programming analysis can identify process effects in the range of candidate process effects by solving for coefficients associated with each incremental candidate process effect in the range. Process effects associated with non-zero coefficients can be determined to contribute to the overall uniformity of the tire. Other suitable techniques can be used to identify candidate process effects without deviating from the scope of the present disclosure.

At (104), a set of a plurality of tires is identified for analysis. The set of tires should be made according to a similar manufacturing process such that a process harmonic associated with the candidate process effect will manifest in each of the plurality of tires in the set of tires. It should be appreciated that even though all tires in the set of tires are made in accordance with the same or similar manufacturing process, it is possible that some process effects will not manifest their maximum influence in every tire. For example, a process effect having a harmonic number of less than 1.0 may only present its maximum amplitude in every other tire, every third tire, etc., in a consecutively manufactured set of tires. The set of tires can include any suitable number of tires, such as 10 or more tires. For instance, in a particular implementation, the set of tires can include twenty tires. Preferably, the tires in the set of tires are manufactured in a sequential order.

At (106), the method includes obtaining a sequence of observed magnitudes of static balance for the set of tires. The sequence of observed magnitudes specifies a magnitude of static balance for each tire in the set of tires. As used herein, "obtaining a sequence of observed magnitudes" can include actually performing the uniformity measurements to identify static balance or accessing the uniformity measurements stored in, for instance, a memory of a computing device.

The sequence of observed magnitudes can be indexed by tire. In particular, the sequence of observed magnitudes can have an index that associates each particular magnitude of static balance with a specific tire in the set of tires. For instance, the index can specify a magnitude for each tire t=1, t=2, 1=3, . . . t=Q for a set of Q tires. The index can have a start point. For instance, the index can specify that the first observed magnitude in the sequence of observed magnitudes is associated with the first tire in the set of tires (i.e. t=1).

Figure 2:
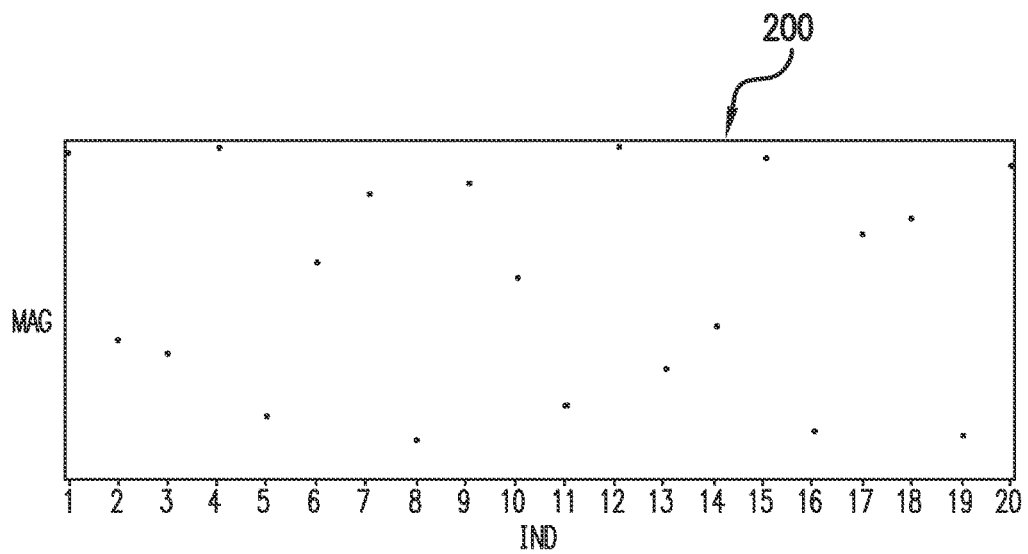
FIG. 2 depicts an exemplary sequence of observed magnitudes of static balance for a set of tires according to an exemplary embodiment of the present disclosure.

FIG. 2 depicts a graphical representation of an exemplary sequence of observed magnitudes 200 of static balance obtained for a set of twenty tires. FIG. 2 plots the index (e.g. t=1, t=2, etc.) along the abscissa and magnitude of static balance along the ordinate. As demonstrated by FIG. 2, the magnitude of static balance can vary from tire to tire based at least in part on one or more process effects. According to aspects of the present disclosure, a magnitude of a process harmonic can be determined from the pattern of magnitudes of static balance.

Referring back to FIG. 1 at (108), the method includes obtaining a baseline magnitude pattern associated with the candidate process effect. Each candidate process effect will have its own unique baseline magnitude pattern. The baseline magnitude pattern specifies a baseline magnitude of static balance for each tire in the set of tires. Obtaining a baseline magnitude pattern can include accessing a pre-computed baseline magnitude pattern associated with the candidate process effect stored in a memory. Alternatively, obtaining a baseline magnitude pattern can include computing the baseline magnitude pattern for each candidate process effect on the fly after identifying the candidate process effect.

Similar to the sequence of observed magnitudes, the baseline magnitudes specified by the baseline magnitude pattern can be indexed by tire. In particular, the baseline magnitude pattern can have an index that associates each particular baseline magnitude with a specific tire in the set of tires. For instance, the index can specify a baseline magnitude for each tire t=1, t=2, 1=3, . . . t=Q for a set of Q tires. The index can have a start point. For instance, the index can specify that the first baseline magnitude in the baseline magnitude pattern is associated with the first tire in the set of tires (i.e. t=1).

Figure 3:
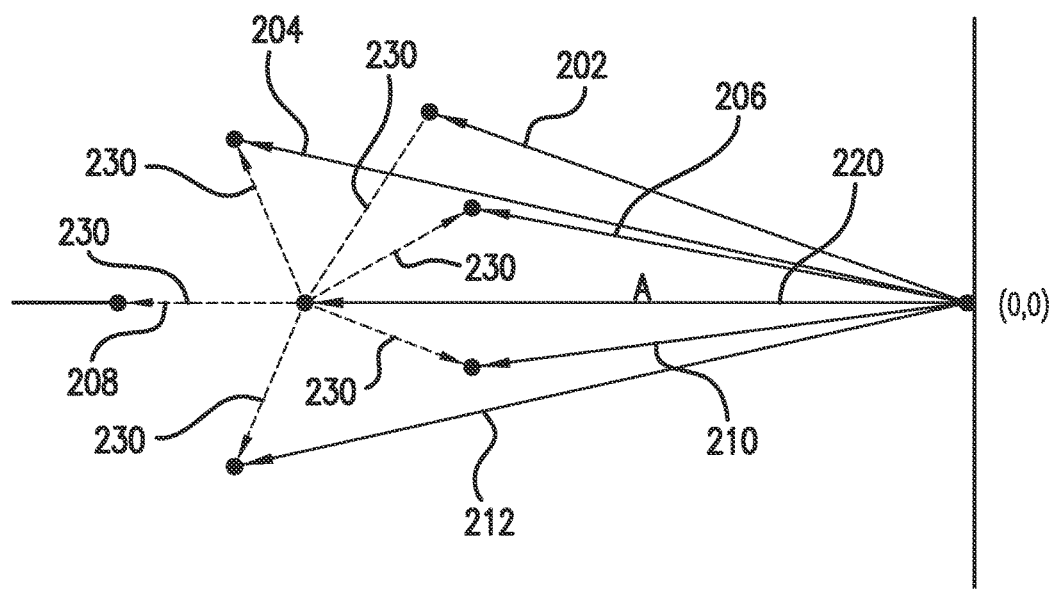
FIG. 3 depicts a vector representation of process effect induced changes on static balance in a set of tires.

The baseline magnitude pattern for a particular candidate process effect can be determined by modeling the process effect induced changes on the magnitude of static balance measurements for the set of tires. FIG. 3 depicts a vector representation of process effect induced changes in static balance magnitude for a set of tires. Vectors 202, 204, 206, 208, 210, and 212 are representative of observed static balance measurements (magnitude and phase angle) for an exemplary set of six tires. The present graphical illustration will be discussed with reference to static balance vectors including both magnitude and phase angle information for purposes of illustration and discussion. Those of ordinary skill in the art, using the disclosures provided herein, will understand that the process effect induced changes on static balance can be determined from scalar representations of the magnitude of static balance.

Referring to FIG. 3, the magnitude and phase angle of the vectors 202, 204, 206, 208, 210, and 212 differs from tire to tire. The phase angle of the vectors 202 can be measured relative to the horizontal axis or other suitable reference. The process harmonic induced changes in vector magnitude can be modeled as a fixed vector 220 of magnitude A and a phase angle of zero to which can be added another vector 230 of magnitude m which can vary its phase angle from 0 to 360 degrees. The variation of the phase angle of vector 230 can be driven by the process effect.

The process harmonic waveform driving the variation in the phase angle of vector 130 can have a waveform pattern defined as follows:

$$w_i = A + m\left(\cos\left(\frac{2\pi i h_p}{N}\right) + \sin\left(\frac{2\pi i h_p}{N}\right)\right) \quad (1)$$

where $w_i$ is the magnitude of the process harmonic for each waveform point i, A is the magnitude of the fixed vector 120, m is the magnitude of the vectors 130 with varying phase angles added to the fixed vector 120, N is the number of waveform points per tire, and $h_p$ is the harmonic number associated with the process harmonic.

The observed magnitude of static balance for each tire can be derived by finding the first harmonic amplitude of the waveform set forth in equation (1) above with the appropriate subset of index values belonging to each tire. In particular, the magnitude M for an individual tire is given by the following formula where $\omega=2\pi/N$ and $\omega^*=2\pi h_p/N$:

$$w_t = A + m(\cos(\omega^* t) + \sin(\omega^* t)) \quad (2)$$

$$C = \frac{m}{n}\sum_{t=1}^{n}(\cos(\omega^* t) + \sin(\omega^* t))\cos(\omega t)$$

$$S = \frac{m}{n}\sum_{t=1}^{n}(\cos(\omega^* t) + \sin(\omega^* t))\sin(\omega t)$$

$$M = (C^2 + S^2)$$

The baseline magnitude pattern can be generated for a candidate process effect using the above model. In particular, baseline magnitudes can be generated for each tire using equation (2) above by setting m and A equal to baseline values and calculating the magnitude M. For instance, in one implementation, the baseline magnitudes can be generated for each tire by setting m=1 and A=0. This choice of baseline should the best for most applications but other choices may be used to make the computations easier. Other suitable techniques for calculating a baseline pattern using the above model can be used without deviating from the scope of the present disclosure. For instance, the baseline magnitude pattern can be determined by setting m and A to different baseline values. Once the baseline magnitude has been determined for each tire, the baseline magnitudes can be combined and indexed by tire to form the baseline magnitude pattern for the candidate process effect.

Referring back to FIG. 1 at (110), the method includes estimating a magnitude of a process harmonic from the sequence of observed magnitudes and the baseline magnitude pattern. For instance, a model can be constructed correlating the baseline magnitude pattern with the sequence of observed magnitudes of static balance. Regression, programming, or other correlation techniques can be used to estimate the magnitude of the process harmonic to best fit the baseline magnitude pattern to the observed magnitudes. As a result, a magnitude of a process harmonic can be estimated using only the observed magnitudes of static balance for the set of tires and the baseline magnitude pattern for the candidate process effect. Azimuth or phase angle information is not required to estimate the magnitude of the process effect.

Figure 4:
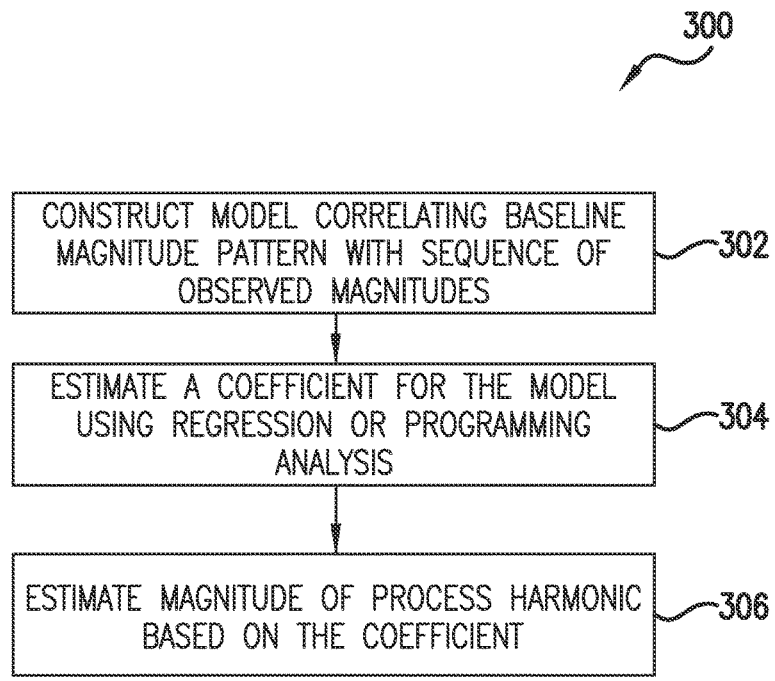
FIG. 4 depicts a flow diagram of an exemplary method for estimating a magnitude of a process harmonic based at least in part on a sequence of observed magnitudes and a baseline magnitude pattern according to an exemplary embodiment of the present disclosure.

FIG. 4 depicts a flow diagram of an exemplary method (300) for estimating the magnitude of the process harmonic based on the baseline magnitude pattern and the sequence of observed magnitudes according to an exemplary embodiment of the present disclosure. At (302), the method includes constructing a model correlating the baseline magnitude pattern with the sequence of observed magnitudes for the set of tires. An exemplary model is provided below:

$$m_t = \alpha + \beta \cdot m_p + \epsilon \quad (4)$$

where $m_t$ represents the sequence of observed magnitudes of static balance for the set of tires, $m_p$ represents the baseline magnitude(s) associated with the candidate process effect, the $\alpha$ coefficient represents the A term in equation (1), and the $\beta$ coefficient represents the process harmonic magnitude m for the candidate process effect, and $\epsilon$ represents a residual(s). In matrix form the model can be expressed as follows:

$$\begin{bmatrix} m_1^t \\ m_2^t \\ m_3^t \\ \vdots \\ m_{q-1}^t \\ m_q^t \end{bmatrix} = \alpha + \beta \cdot \begin{bmatrix} m_1^p \\ m_2^p \\ m_3^p \\ \vdots \\ m_{q-1}^p \\ m_q^p \end{bmatrix} + \begin{bmatrix} \varepsilon_1 \\ \varepsilon_2 \\ \varepsilon_3 \\ \vdots \\ \varepsilon_{q-1} \\ \varepsilon_q \end{bmatrix} \quad (5)$$

where $m_q^t$ represents the observed magnitude of static balance for each tire of q=1 to q=Q tires, $m_q^p$ represents the baseline magnitude of static balance associated with the candidate process effect for each tire of q=1 to q=Q tires, the $\alpha$ coefficient represents the A term in equation (1), and the $\beta$ coefficient represents the process harmonic magnitude m for the candidate process effect, and $\epsilon_q$ represents the residual associated with each tire of q=1 to q=Q tires.

At (304), the coefficient $\beta$ for the candidate process effect is estimated using a regression analysis or a programming analysis. The regression analysis, such as a linear regression analysis, can estimate coefficients for the model (e.g. $\alpha$ and $\beta$) such that the model best fits the sequence of observed magnitudes. For instance, the regression analysis can estimate coefficients to minimize the squared errors (i.e. the residuals) in the model.

Another approach that can be used to estimate the coefficients includes a programming approach. Using a programming approach, the coefficients are estimated to minimize the absolute error (e.g. residual) between the observed magnitude for a tire and the estimated value for the tire using the model. The coefficients can be estimated using a linear, quadratic, or other suitable programming approach.

Once the coefficient $\beta$ for the candidate process effects have been estimated, the magnitude of the process harmonic can be estimated based on the coefficient (306). For instance, the magnitude of the process harmonic can be determined to be equal to the coefficient $\beta$ when the baseline magnitude has been set to a value of one.

Referring back to FIG. 1 at (112), the method can include modifying tire manufacture based on the estimated magnitude of the process harmonic to improve the uniformity of a tire. In particular, the estimated magnitude can be used to better analyze uniformity measurements and/or to correct various aspects of the tire manufacturing process. For example, the estimated magnitude can be compared to a threshold. Corrective action can be taken if the magnitude exceeds the threshold. The particular process harmonic can be used to determine the offending part of the tire manufacturing process that needs to be corrected/adjusted. A catalog of such static balance process effects can be created and used to more quickly solve future process upsets if they are caused by the same effects. This can be particularly beneficial in cases where the analysis techniques disclosed herein are used to search for unknown candidate process harmonics.

For example, once a process effect associated with a particular harmonic number (e.g. 1.2) is identified, the process effect can be used to track back to the cause of the process effect by first identifying possible cyclic elements in the tire manufacturing process. The relative period of these cyclic elements (e.g. 1.5 m, 1.33 m, 1.00 m and 0.75 m) can be computed and compared to the circumference of the tire (e.g. 1.2 m). This gives the process harmonic number for each potential cause (0.8, 0.9, 1.2 and 1.6). Then one can select the closest matching potential cause to the identified active process harmonic.

For instance, an extruder cycle can be matched with a process effect having a harmonic number of 1.2 in tread thickness variation. If the amplitude of the process effect exceeds a given level (e.g. 0.25 kg force) then corrective action can be taken to address the extruder cycle. The appropriate threshold can balance the competing demands of final static balance, the cost of implementing the process control, and the stability of the process harmonic effect. Such corrective action can include retuning the extruder control system algorithm, changing the extruder speed, and/or purposely stretching the tread to counteract the variation that is caused by the extruder cycle.

As another example, the estimated magnitude can be determined across different time intervals of the manufacturing process. The estimated process harmonic magnitudes can be compared across the time intervals to assess the stability of the process effects and to determine if any new upsets in the manufacturing process have occurred. For instance, if an estimated process harmonic magnitude changes across different time intervals, this can provide an indication of the need for a maintenance event to address the particular process effect. Corrective action can be taken to address changes in the estimated process harmonic magnitude(s). This analysis can be done over several overlapping time horizons to detect longer term process effects on stability.

As yet another example, tire uniformity improvement can be achieved by altering the relative angular position of known manufacturing components in a tire to reduce the magnitude of the measured uniformity parameter for one or more tire harmonics of interest. However, this type of uniformity analysis can be hindered by the impact of process effects whose periodic contributions to the composite uniformity measurement are not identical to the tire harmonics, resulting in poorer compensations and adjustments. Identification of such uniformity contributions resulting from process effects can help improve the accuracy of uniformity analysis as well as the tire building process. The level of improvement in static balance control that is achievable from the identification of process harmonics can be far larger than that which can be obtained when only tire harmonic information is available.

Synchronizing the Baseline Magnitude Pattern with the Sequence of Observed Magnitudes According to aspects of the present disclosure, the magnitude of the process harmonic can be estimated based on a sequence of observed magnitudes of static balance. Preferably, the sequence of observed magnitudes and the baseline magnitude pattern are synchronous such that the index for both the sequence of observed magnitudes and the baseline magnitude pattern begin at the same tire. If the indices are not synchronous, then the patterns of evolution of the magnitudes of static balance through the sequence of tires will, in general, not match, complicating the analysis.

Figure 5:
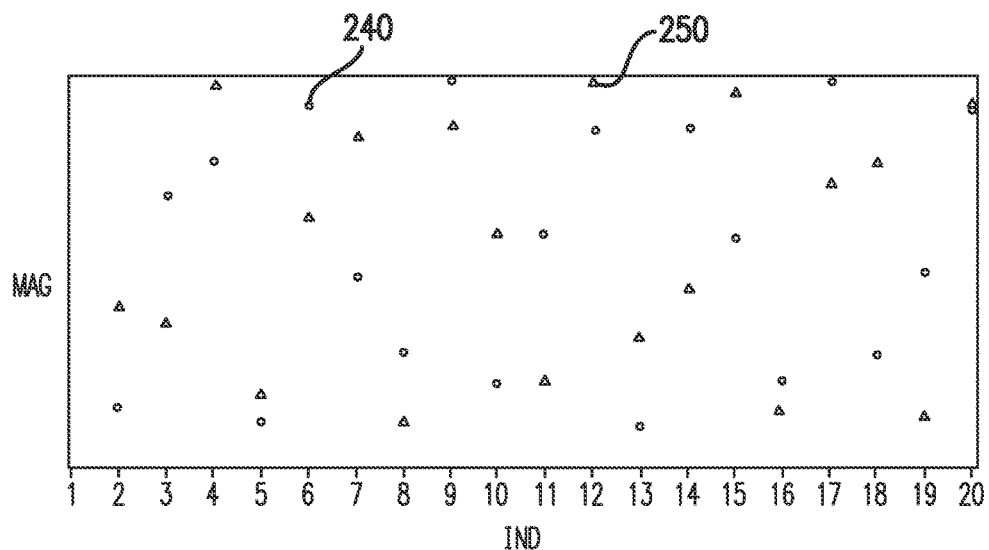
FIG. 5 depicts an exemplary sequence of observed magnitudes and a baseline magnitude pattern that are not synchronous.

For instance, FIG. 5 depicts an exemplary sequence of observed magnitudes 240 and an exemplary baseline magnitude pattern 250 that are not synchronous. FIG. 5 plots the index of the data (e.g. t=1, t=2, etc.) along the abscissa and magnitude of static balance along the ordinate. The baseline magnitude pattern 250 is multiplied by 200 to make the graph readable. As shown, the sequence of observed magnitudes 240 and the baseline magnitude pattern 250 do not exhibit the same pattern.

To ensure that the sequence of observed magnitudes and the baseline magnitude pattern are synchronous, the data can be physically guaranteed to be synchronous. This can often be accomplished by checking the start points of extrusion processes or bobbin roll-up operations. Alternatively, the data can be used to identify a baseline magnitude pattern that is synchronous with the sequence of observed magnitudes.

In particular, a plurality of baseline magnitude patterns for each candidate process effect can be specified. Each of the baseline magnitude patterns can have an index with a starting point at different locations. More particularly, each of the baseline magnitude patterns can have an index associated with a different starting point. For instance, a first baseline magnitude pattern can be generated and associated with an index that starts at tire t=1. A second baseline magnitude pattern can be generated and associated with an index that starts at tire t=2. A third baseline magnitude pattern can be generated and associated with an index that starts at tire t=3, and so forth. If increased resolution is desired, the baseline magnitude patterns can be lagged by non-integer amounts, such as by t=0.245 and the like.

A regression (e.g. a stepwise regression) or a programming analysis can be used to determine which of the baseline magnitude patterns best approximates the observed magnitudes. More particularly, a model can be constructed correlating the sequence of observed magnitudes with the plurality of different baseline magnitude patterns. The model can take the form of equation (4) above. Regression or programming techniques can be performed to identify coefficients associated with each of the baseline magnitude patterns. The baseline magnitude pattern that best correlates with the sequence of observed magnitudes can be identified as synchronized with the sequence of observed magnitudes. The coefficient determined for the baseline magnitude pattern that is synchronized with the sequence of observed magnitudes can be used to estimate the magnitude of the process harmonic for the process effect.

Application to a Plurality of Candidate Process Effects

A model can also be constructed to identify process harmonic magnitude(s) for multiple candidate process effects. An exemplary model correlating a sequence of observed magnitudes with a baseline magnitude pattern for each of a plurality of candidate process effects is provided below:

$$\begin{bmatrix} m_1^t \\ m_2^t \\ m_3^t \\ \vdots \\ m_{q-1}^t \\ m_q^t \end{bmatrix} = \alpha + \begin{bmatrix} m_1^1 & m_1^2 & \ldots & m_1^P \\ m_2^1 & m_2^2 & \ldots & m_2^P \\ m_3^1 & m_3^2 & \ldots & m_3^P \\ \vdots & \vdots & \vdots & \vdots \\ m_{q-1}^1 & m_{q-1}^2 & \ldots & m_{q-1}^P \\ m_q^1 & m_q^2 & \ldots & m_q^P \end{bmatrix} \cdot \begin{bmatrix} \beta_1 \\ \beta_2 \\ \vdots \\ \beta_P \end{bmatrix} + \begin{bmatrix} \varepsilon_1 \\ \varepsilon_2 \\ \varepsilon_3 \\ \vdots \\ \varepsilon_{q-1} \\ \varepsilon_q \end{bmatrix} \quad (6)$$

where $m_q^t$ represents the observed magnitude of static balance for each tire of q=1 to q=Q tires, $m_q^p$ represents the baseline magnitude of static balance associated with the candidate process effect for each tire of q=1 to q=Q tires, the α coefficient represents the A term in equation (1), and the $\beta_p$ coefficient represents the process harmonic magnitude m for candidate process effect p=1 to p=P candidate process effects, and $\varepsilon_q$ represents the residual associated with each tire of q=1 to q=Q tires.

Once the model is constructed correlating the sequence of observed magnitudes with the baseline magnitude pattern for each of the plurality of candidate process effects, regression or programming techniques can be used to determine the respective coefficients $\beta_p$ for each candidate process effect. The coefficients $\beta_p$ can each represent the magnitude of the process harmonic for one of the plurality of candidate process effects.

It is possible to use the above approach to search for unknown candidate process harmonics. In particular, a set of candidate process effects stepped incrementally over a range of candidate process effects (e.g. 0.2, 0.3, 0.4, ... 1.4, etc.) can be identified. Baseline magnitude patterns can be obtained for each of the candidate process effects. A model can be constructed correlating the sequence of observed magnitudes with the plurality of baseline magnitude patterns. Regression or programming techniques can then be performed to estimate magnitudes of process harmonics associated with each of the plurality of candidate process effects. Process effects associated with non-zero coefficients can be determined to contribute to the overall uniformity of the tire.

If the candidate process effects include known process effects, then a regression or programming solution that estimates non-zero coefficients for all candidate process effects will be sufficient. However, if a search for unknown process effects is contemplated, a stepwise regression or lasso approach can be used to find a sparse solution in which only coefficients of some subset of the candidate process effects will be selected.

In the case of multiple candidate process effects, the same approach for synchronizing a single baseline magnitude pattern can be applied for multiple baseline magnitude patterns. In particular, several lag versions of each baseline magnitude pattern can be determined for each candidate process effect. A model can be constructed correlating the sequence of observed magnitudes with each of the baseline magnitude patterns. Regression or programming techniques can then be performed to estimate magnitudes of process harmonics associated with each of the plurality of candidate process effects.

Use of Residuals to Identify Unknown Process Effects

Figure 6:
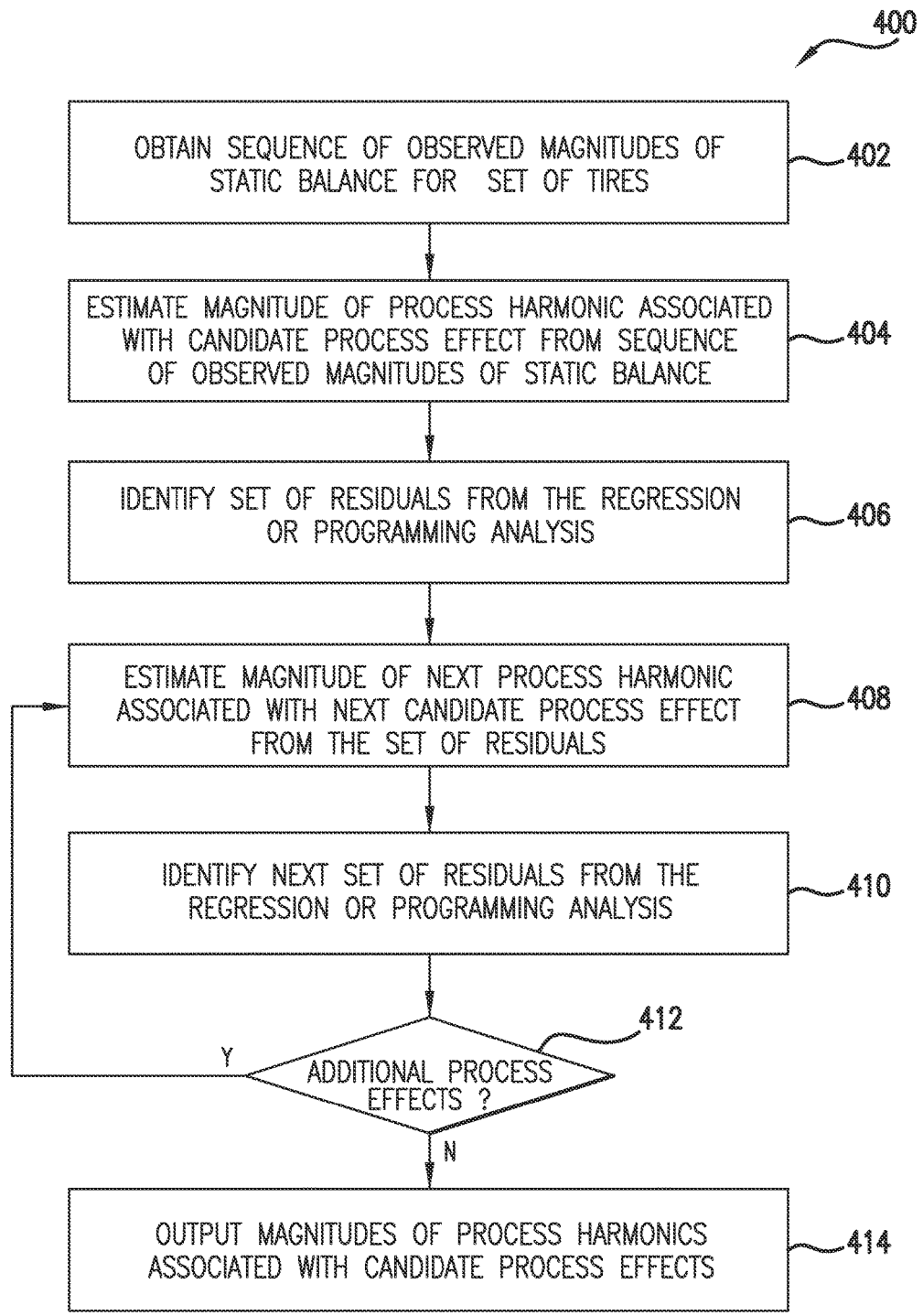
FIG. 6 depicts a flow diagram of an exemplary method for estimating a magnitude of a process harmonic for multiple candidate process effects according to an exemplary embodiment of the present disclosure.

According to a particular aspect of the present disclosure, residuals generated during a regression analysis or a programming analysis can be used to identify unknown process effects. FIG. 6 depicts a flow diagram of an exemplary method (400) for using residuals to identify unknown process effects according to an exemplary embodiment of the present disclosure. At (402), the method includes obtaining a sequence of observed magnitudes of static balance for a set of tires. Obtaining the sequence of observed magnitudes of static balance can include actually performing the uniformity measurements to identify static balance or accessing the uniformity measurements stored in, for instance, a memory of a computing device.

At (404), the magnitude of a process harmonic associated with a candidate process effect can then be estimated from the sequence of observed magnitudes using any of the techniques disclosed herein. In particular, a model can be constructed correlating the sequence of observed magnitudes with one or more baseline magnitude patterns and regression or programming techniques can be used to estimate coefficients for the model.

At (406), the set of residuals resulting from the analysis of the sequence of observed magnitudes can be identified. For example, in the model provided by equations (5) or (6) above, a residual $\epsilon_q$ associated with each tire of q=1 to q=Q tires can be determined as a result of the regression or programming analysis.

At (408), the magnitude of an additional process harmonic associated with a different or next candidate process effect can be identified based on the set of residuals. In particular, the set of residuals can represent a sequence of observed magnitudes for the set of tires for identification of a second candidate process effect. Baseline magnitude patterns for a plurality of candidate process effects in stepped increments (e.g. 0.2, 0.3, 0.4, . . . 1.4, etc.) can be obtained. A model can be constructed correlating the baseline magnitude patterns with the set of residuals. As discussed above, regression or programming analysis can be performed to identify candidate process effects associated with non-zero coefficients and to provide an estimated magnitude of a process harmonic for the candidate process effects.

At (410), the next set of residuals resulting from the analysis of the first set of residuals can be identified. For example, in the model provided by equations (5) or (6) above, another set of residuals $\epsilon_q$ associated with each tire of q=1 to q=Q tires can be determined as a result of the regression or programming analysis.

At (412), it is determined whether it is possible that additional process effects can be identified from the residuals. For instance, it can be determined whether the residuals exhibit a pattern or whether the standard deviation of the residuals is still better than that of the measurement error for the sequence of observed magnitudes. If additional process effects can be determined from the residuals, the method continues to iteratively analyze the residuals to identify additional candidate process effects until additional process effects can no longer be identified from the residuals. The estimated magnitudes of the process harmonics associated with the identified candidate process effects can then be output for use in tire uniformity improvement (414).

Exemplary System for Improving the Uniformity of a Tire

Figure 7:
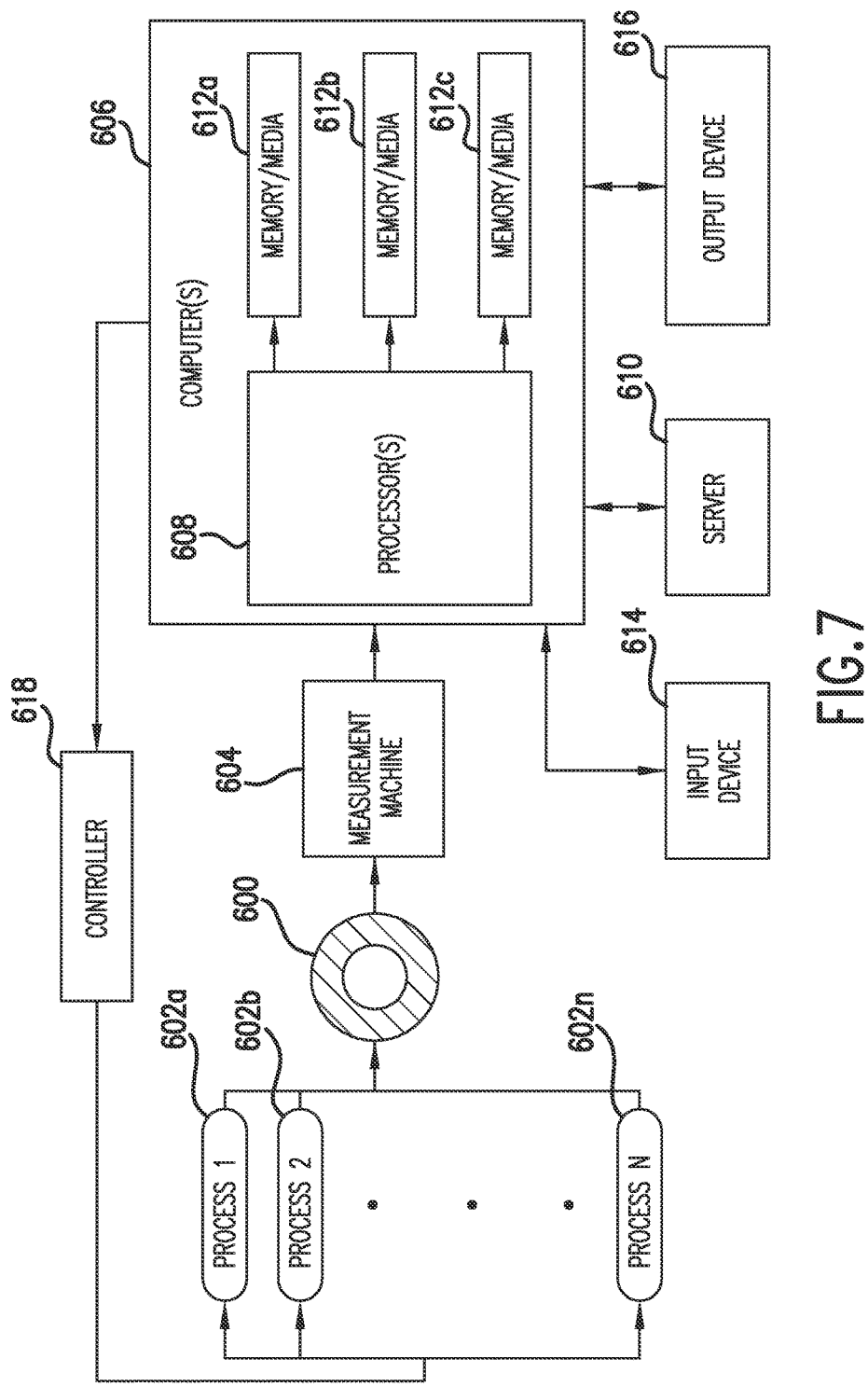
FIG. 7 depicts an exemplary system for improving the uniformity of a tire according to an exemplary embodiment of the present disclosure.

Referring now to FIG. 7, a schematic overview of exemplary system components for implementing the above-described methods is illustrated. An exemplary tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing mold, and curing the finished green tire, etc. Such respective process elements are represented as 602a, 602b, . . . , 602n in FIG. 7 and combine to form exemplary tire 600. It should be appreciated that a batch of multiple tires can be constructed from one iteration of the various processes 602a through 602n.

Referring still to FIG. 7, a measurement machine 604 is provided to obtain the static balance measurements of the tire 600 and/or other uniformity measurements. In one exemplary measurement machine 604, the tire 600 can be placed on its vertical axis. Gravity causes the portion of the tire 600 with the greatest mass to deflect downward. The measurement machine 604 can measure the magnitude and azimuthal location of the deflection to provide a measurement of the static balance of the tire.

The measurements obtained by measurement machine 604 can be relayed such that they are received at one or more computing devices 606, which may respectively contain one or more processors 608, although only one computer and processor are shown in FIG. 7 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 7 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in the memory elements 612a, 612b, and 612c to cause the processor to perform operations. The operations can include identifying at least one candidate process effect; obtaining a sequence of observed magnitudes for the set of tires; obtaining a baseline magnitude pattern associated with the candidate process effect; and determining, a magnitude of a process harmonic associated with the candidate process effect based at least in part on the sequence of observed magnitudes and the baseline magnitude pattern.

Example #1

A sequence of observed magnitudes of static balance were simulated across a set of 20 tires based on a process harmonic having a magnitude of 200 and a harmonic number of 1.1832651. A baseline magnitude pattern for a candidate process effect associated with harmonic number of 1.1832651 was identified. A model correlating the sequence of observed magnitudes with the baseline magnitude pattern was constructed as follows:

$$\begin{bmatrix} 288.525 \\ 258.950 \\ 259.048 \\ 288.533 \\ 247.034 \\ 274.644 \\ 279.045 \\ 245.238 \\ 286.416 \\ 263.884 \\ 254.493 \\ 289.610 \\ 250.021 \\ 269.763 \\ 282.929 \\ 244.463 \\ 283.475 \\ 269.064 \\ 250.489 \\ 289.747 \end{bmatrix} = \alpha + \beta \cdot \begin{bmatrix} 1.44298 \\ 1.30088 \\ 1.29064 \\ 1.44608 \\ 1.24456 \\ 1.35958 \\ 1.41075 \\ 1.22522 \\ 1.41889 \\ 1.34821 \\ 1.25183 \\ 1.44834 \\ 1.28018 \\ 1.31213 \\ 1.43867 \\ 1.23352 \\ 1.38073 \\ 1.39287 \\ 1.22891 \\ 1.44331 \end{bmatrix} + \begin{bmatrix} \varepsilon_1 \\ \varepsilon_2 \\ \varepsilon_3 \\ \varepsilon_4 \\ \varepsilon_5 \\ \varepsilon_6 \\ \varepsilon_7 \\ \varepsilon_8 \\ \varepsilon_9 \\ \varepsilon_{10} \\ \varepsilon_{11} \\ \varepsilon_{12} \\ \varepsilon_{13} \\ \varepsilon_{14} \\ \varepsilon_{15} \\ \varepsilon_{16} \\ \varepsilon_{17} \\ \varepsilon_{18} \\ \varepsilon_{19} \\ \varepsilon_{20} \end{bmatrix}$$

A regression analysis was performed to estimate the coefficient β. The regression analysis estimated a value for β of 199.99987 with an error of 0.09251. Since the true value of the magnitude is 200, the above example demonstrates that the techniques according to aspects of the present disclosure can be used to accurately estimate a magnitude of a process harmonic associated with a candidate process effect using a sequence of observed magnitudes of static balance for a set of tires.

Example #2

A sequence of observed magnitudes of static balance were simulated across 20 tires by simulating an underlying static balance waveform across the set of tires according to the following:

$$w_i = 100 * \cos(2 * \pi * i * 0.87/128) + 100 * \cos(2 * \pi * i * 0.94/128) + \epsilon_i$$

This underlying static balance waveform includes process harmonics associated with two process effects, each having a magnitude of 100. The first process harmonic is associated with a process effect having a harmonic number of 0.87 and the second process harmonic is associated with a process effect having a harmonic number of 0.94. The waveform was simulated for 128 points about the tire with an error standard deviation of 0.05.

Figure 8:
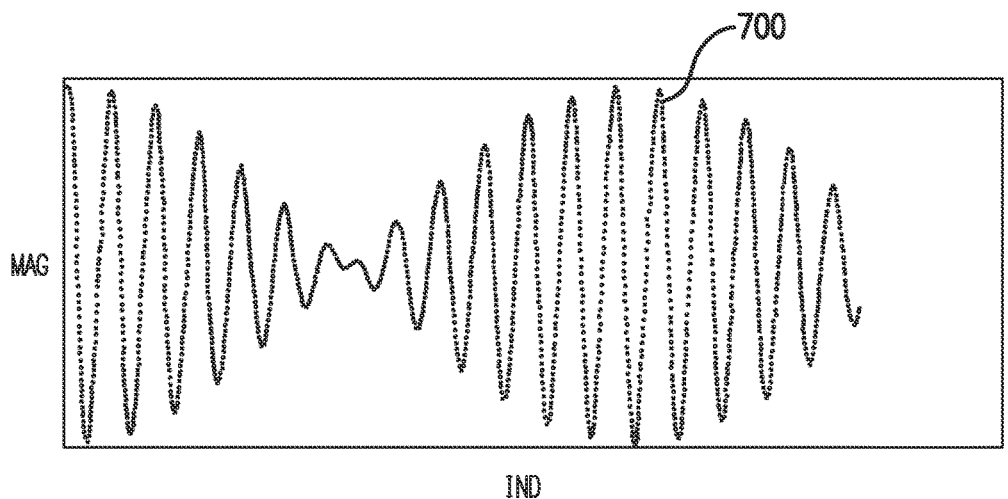
FIG. 8 depicts a plot of an exemplary simulated static balance waveform having multiple process harmonic components across a plurality of tires.
Figure 9:
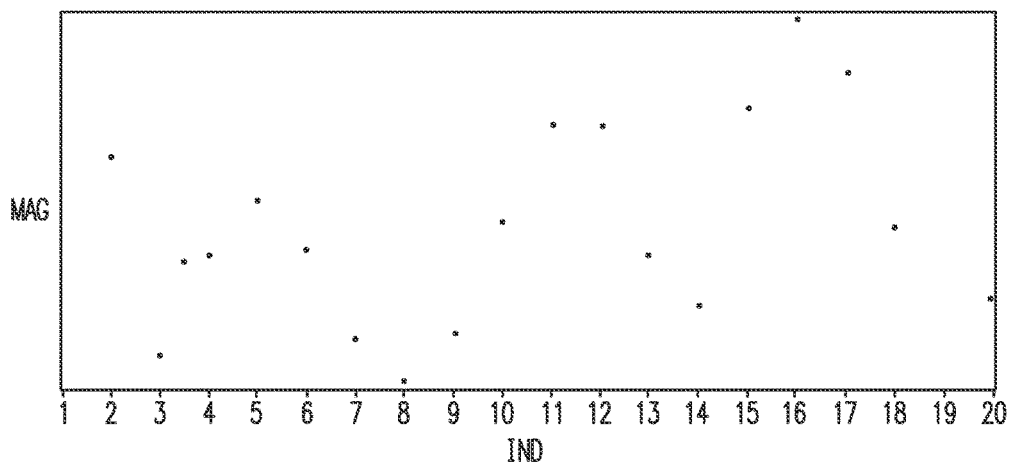
FIG. 9 depicts an exemplary sequence of observed magnitudes derived for each tire from the static balance waveform of FIG. 8.

FIG. 8 depicts a plot of the underlying static balance waveform 700. FIG. 8 plots an index of tire points across the twenty tires along the abscissa and magnitude of the static balance waveform along the ordinate. FIG. 9 depicts the tire by tire sequence of observed magnitudes of static balance for the set of twenty tires determined from this simulated underlying waveform 700 of FIG. 8. FIG. 9 plots the index of the sequence of observed magnitudes along the abscissa and observed magnitude along the ordinate.

The baseline magnitude pattern for a known candidate process effect having a harmonic number of 0.87 was determined. In particular, a model was constructed correlating the sequence of observed magnitudes with the baseline magnitude pattern. A regression analysis was performed to estimate a magnitude of 115.57 for the first process harmonic associated with the candidate process effect having a harmonic number of 0.87.

Figure 10:
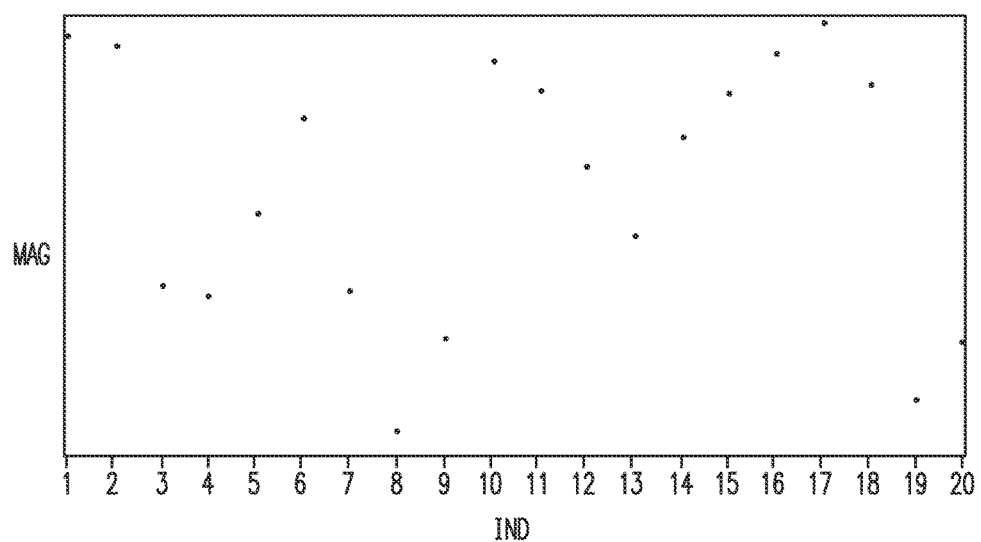
FIG. 10 depicts exemplary residuals obtained from a regression analysis of the sequence of observed magnitudes depicted in FIG. 9.

FIG. 10 depicts the residuals determined during the regression analysis. FIG. 10 plots the index of the residuals by tire along the abscissa and magnitude of the residual along the ordinate. This set of residuals was used as the sequence of observed magnitudes in a subsequent regression against a new set of baseline magnitude patterns. The new set of baseline magnitude patterns included a baseline magnitude pattern associated with a candidate process effect of 0.94 and a plurality of baseline magnitudes for a grid of candidate process effects in stepped increments. The second regression produced an estimated magnitude of 82.75 for the second process harmonic associated with the candidate process effect having a harmonic number of 0.94.

As demonstrated by the above example, a first process harmonic associated with a known candidate process effect can be removed from the data by analyzing the residuals to discover a second process harmonic. This process of identifying a single process harmonic, removing its effects, and then examining the residuals for additional process harmonics can be continued until the remaining residuals appear to be without pattern or until the standard deviation of the residuals is on the same order as that of the measurement error of the sequence of observed magnitudes.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system for improving the uniformity of tires, the system comprising:
a measurement machine configured to obtain static balance measurements for each tire in a set of a plurality of tires; and
a computing device coupled to the measurement machine, the computing device comprising one or more processors and at least one non-transitory computer-readable memory, the at least one memory storing computer-readable instructions that when executed by the one or more processors causes the one or more processors to perform operations, the operations comprising:

identifying at least one candidate process effect;

obtaining a sequence of observed magnitudes for the set of tires, the sequence of observed magnitudes comprising a magnitude of static balance for each tire in the set of tires;

obtaining a baseline magnitude pattern associated with the candidate process effect, the baseline magnitude pattern comprising a baseline magnitude of static balance for each tire in the set of tires; and determining a magnitude of a process harmonic associated with the candidate process effect based at least in part on the sequence of observed magnitudes and the baseline magnitude pattern.

2. The system of claim 1, wherein the operation of determining the magnitude of the process harmonic associated with the candidate process effect comprises:

construing a model correlating the sequence of observed magnitudes with the baseline magnitude pattern;

estimating a coefficient for the model; and determining the magnitude of the process harmonic based at least in part on the coefficient.

3. The system of claim 2, wherein the coefficient is estimated using a regression analysis or a programming analysis.

4. The system of claim 2, wherein the operation of determining the magnitude of the process harmonic associated with the candidate process effect further comprises determining a plurality of residuals for the model.

5. The system of claim 4, wherein the operations further comprise using the plurality of residuals as a second sequence of observed magnitudes for determining a magnitude of a process harmonic associated with a second candidate process effect.

6. The system of claim 1, wherein the sequence of observed magnitudes and the baseline magnitude pattern are synchronized such that an index of the sequence of observed magnitude and an index of the baseline magnitude pattern start at the same tire.

7. The system of claim 6, wherein the operations further comprise identifying a baseline magnitude pattern that is synchronized with the sequence of observed magnitudes.

8. The system of claim 7, wherein the operation of identifying the baseline magnitude pattern that is synchronized with the sequence of observed magnitudes comprises:

generating a plurality of baseline magnitude patterns for the at least one candidate process effect, each of the plurality of baseline magnitude patterns having an index with a different starting point;

constructing a model correlating the sequence of observed magnitudes with the plurality of baseline magnitude patterns;

estimating coefficients for the model using a regression analysis or a programming analysis; and identifying a baseline magnitude pattern from the plurality of baseline magnitude patterns that is synchronized with the sequence of observed magnitudes based on the coefficients.

9. The system of claim 1, wherein the at least one candidate process effect comprises a plurality of candidate process effects, and wherein the operations further comprise determining a magnitude of a process harmonic associated with each of the plurality of candidate process effects.

10. The system of claim 1, wherein the operation of identifying at least one candidate process effect comprises identifying a set of candidate process effects stepped incrementally over a range of candidate process effects.

11. The system of claim 1, wherein each time in the set of tires is made in a similar manufacturing process such that the at least one candidate process effect will manifest in the set of tires.

12. The system of claim 11, wherein the plurality of tires in the set of tires are manufactured in a sequential order.

13. The system of claim 1, wherein the operations further comprise modifying tire manufacture based at least in part on the magnitude of the process harmonic.

14. The system of claim 13, wherein the operation of modifying tire manufacture comprises:

comparing the magnitude of the process harmonic to a threshold; and taking corrective action to address the process harmonic when the magnitude of the process harmonic exceeds the threshold.

15. The system of claim 13, wherein the operation of modifying tire manufacture comprises comparing the magnitude of the process harmonic across a plurality of different time intervals to detect a process change.

* * * * *